United States Patent
Cromer et al.

(10) Patent No.: US 7,113,497 B2
(45) Date of Patent: Sep. 26, 2006

(54) BANDWIDTH MANAGEMENT IN A WIRELESS NETWORK

(75) Inventors: Daryl Carvis Cromer, Apex, NC (US); Philip John Jakes, Durham, NC (US); Howard Jeffrey Locker, Cary, NC (US)

(73) Assignee: Lenovo (Singapore) Pte. Ltd., (SG)

( * ) Notice: Subject to any disclaimer, the term of this patent is extended or adjusted under 35 U.S.C. 154(b) by 1035 days.

(21) Appl. No.: 10/141,148

(22) Filed: May 8, 2002

(65) Prior Publication Data

US 2003/0210672 A1 Nov. 13, 2003

(51) Int. Cl.
*H04Q 7/24* (2006.01)
*H04Q 7/28* (2006.01)
*H04L 12/28* (2006.01)
*H04L 12/56* (2006.01)
*H04H 1/00* (2006.01)
*H04J 3/16* (2006.01)
*H04J 3/22* (2006.01)
*H04L 12/413* (2006.01)

(52) U.S. Cl. ..................... 370/338; 370/389; 370/445; 370/468

(58) Field of Classification Search ............. 370/338, 370/468, 241, 474, 235.1, 252, 230, 235, 370/448, 455, 322, 348, 395.21, 395.41, 370/395, 389, 236, 445; 709/201, 224, 228, 709/237, 232; 455/63.1, 433
See application file for complete search history.

(56) References Cited

U.S. PATENT DOCUMENTS

| | | | |
|---|---|---|---|
| 5,644,576 | A | 7/1997 | Bauchot et al. |
| 5,768,271 | A * | 6/1998 | Seid et al. ................. 370/389 |
| 5,923,667 | A | 7/1999 | Poiraud et al. |
| 6,085,241 | A | 7/2000 | Otis |
| 6,115,390 | A | 9/2000 | Chuah |
| 6,249,530 | B1 | 6/2001 | Blanco et al. |

(Continued)

OTHER PUBLICATIONS

PCT International Search Reported dated Aug. 6, 2003.

(Continued)

*Primary Examiner*—Chi Pham
*Assistant Examiner*—Prenell Jones
(74) *Attorney, Agent, or Firm*—Carlos Munoz-Bustamante; Dillin & Yudell LLP (57) ABSTRACT

In accordance with the preferred embodiment, an access point provides dynamic load balancing of network bandwidth between access points within the 802.11 wireless LAN. The access point uses the RTS/CTS protocol to reduce the bandwidth available to a single device using an excessive amount of network bandwidth. The access point places a device that has been monopolizing a network channel on a Restricted List, and regulates bandwidth on the network by not returning a CTS to any client on the Restricted List. When the client's network usage drops below a policy driven threshold set by the number of network users, the client is removed from the list and the access point will respond to a RTS from the client with a CTS.

12 Claims, 5 Drawing Sheets

U.S. PATENT DOCUMENTS

| | | |
|---|---|---|
| 6,256,309 B1 | 7/2001 | Daley et al. |
| 6,292,465 B1 | 9/2001 | Vaid et al. |
| 6,310,886 B1 | 10/2001 | Barton |
| 6,456,593 B1 * | 9/2002 | Iverson et al. ........... 370/235.1 |
| 6,781,956 B1 * | 8/2004 | Cheung ................... 370/235.1 |
| 6,865,156 B1 * | 3/2005 | Horioka et al. .......... 370/236.1 |
| 2001/0010689 A1 | 8/2001 | Awater et al. |
| 2001/0014088 A1 | 8/2001 | Johnson et al. |
| 2001/0024434 A1 | 9/2001 | Ayyagari et al. |
| 2001/0024953 A1 | 9/2001 | Balogh |
| 2001/0028639 A1 | 10/2001 | Eikelenboom et al. |
| 2002/0105970 A1 * | 8/2002 | Shvodian ................... 370/468 |
| 2003/0188006 A1 * | 10/2003 | Bard .......................... 709/232 |
| 2005/0073979 A1 * | 4/2005 | Barber et al. ............... 370/338 |
| 2006/0029073 A1 * | 2/2006 | Cervello et al. ............ 370/389 |

OTHER PUBLICATIONS

P'ei-hung Chuang et al., "Dynamic QoS Allocation for Multimedia Ad Hoc Wireless Networks", Oct. 11, 1999, pp. 480-485, Computer Communications and Networks, 1999, IEEE.

Christine Fragouli et al., "Controlled Multimedia Wireless Link Sharing via Enhanced Class-Based Queuing with Channel-State-Dependent Packet Scheduling", IEEE Mar. 1998, pp. 572-580.

* cited by examiner

BANDWIDTH MANAGEMENT IN A WIRELESS NETWORK

BACKGROUND OF THE INVENTION

1. Technical Field

This invention relates generally to data communications, and in particular to data communications in a Local Area Network (LAN). Specifically, the invention is directed to managing wireless access to a LAN.

2. Description of the Related Art

The need for personal wireless communications is expanding rapidly with the advances in digital communications and personal communications systems. The progress in wireless radio technology and the growth rate of the wireless telephone systems over the last several years is indicative of tremendous market demand for location independent communication via wireless access. Many of the current wireless networks architectures are primarily designed and optimized for voice communications and wide area coverage. With the proliferation of personal and portable computers, and local area networks, it is envisioned that data services and applications such as file server access, client-server execution, and electronic mail will require wireless access to the LAN environment supporting distributed computing. The use of wireless communication systems to transmit data traffic utilizing mobile devices which communicate with a hard-wired network, such as a LAN or a wide area network (WAN), has become widespread. A mobile worker can be connected everywhere on an office building or business campus, which translates into increased productivity. Retail stores and warehouses, for example, may use wireless communications systems with mobile data terminals to track inventory and replenish stock. The transportation industry may use such systems at large outdoor storage facilities to keep an accurate account of incoming and outgoing shipments. In manufacturing facilities, such systems are useful for tracking parts, completed products and defects. Since the characteristics and profile of data traffic are very different from those of voice traffic, the wireless access protocol must efficiently accommodate the very dynamic and bursty nature of data traffic.

A typical wireless communications system includes a number of fixed access points (also known as base stations) interconnected by a cable medium often referred to as a system backbone Associated with each access point is a geographic cell. The cell is a geographic area in which an access point has sufficient signal strength to transmit data and receive data from a mobile device such as a data terminal or telephone with an acceptable error rate. Typically, access points will be positioned along the backbones such that the combined cell area coverage from each access point provides full coverage of a building or site. For 802.11(b), an access point provides 11 Mbps, which is shared by a number of users. In the case of WLAN, frequently there is significant overlaps in cells to increase data capacity, since the capacity of the network is a function of the number of access points. So a user typically has access to several different access points in any given location.

Mobile devices such as telephones, pagers, personal digital assistants (PDA's), data terminals etc. are designed to be carried throughout the system from cell to cell. Each mobile device is capable of communicating with the system backbone via wireless communication between the mobile device and an access point to which the mobile device is registered. As the mobile device roams from one cell to another, the mobile device will typically deregister with the access point of the previous cell and register with the access point associated with the new cell.

Recently a standard for wireless local area networks (WLANs) known as the IEEE 802.11 standard has been adopted and has gained acceptance among the industrial, scientific and medical communities. The IEEE 802.11 standard for WLANs is a standard for systems that operate in the 2,400–2,483.5 MHz industrial, scientific and medical (ISM) band. The ISM band is available worldwide and allows unlicensed operation of spread spectrum systems. The IEEE 802.11 RF transmissions use multiple signaling schemes (modulations) at different data rates to deliver a single data packet between wireless systems. The latest IEEE 802.11 wireless LAN uses a band of frequencies near 2.4 Ghz for direct sequence spread spectrum transmissions. Another recently adopted short-range standard has evolved known as the Bluetooth standard (see www.bluetooth.com). The Bluetooth standard is a low-cost short range wireless connection which uses much of the same range of frequencies for its frequency-hopping spread spectrum transmissions as the IEEE 802.11 standard. In some applications, it is appropriate to use systems employing IEEE 802.11 concurrently with other systems using the Bluetooth standard.

In IEEE 802.11 wireless LAN technology, there is a shared transmission medium between the access point and client devices. Since an access point can only be receiving data from one client at a time, a given client can monopolize that channel, effectively reducing throughput available to other clients. So, for example, clients that request bandwidth often, may be granted a disproportionate amount of bandwidth. This problem is further exasperated by the fact that WLAN is a data packet based technology. With digital cellular systems, transmissions are connection based, so the digital cellular setup circuit can guarantee bandwidth to the client. For WLAN clients, data transmissions are bursty in nature, so bandwidth throughout a transmission cannot be guaranteed. Accordingly, there is a strong need in the art for a system and method that prevents a single client on the wireless LAN from monopolizing the network bandwidth.

SUMMARY OF THE INVENTION

In accordance with a preferred embodiment, a method and system of managing bandwidth utilization in a wireless local area network is provided. The wireless local area network includes a plurality of clients that access the network through an access node over a wireless medium. Bandwidth utilized by each client is monitoring through the access node, and a list is dynamically maintained identifying clients that are currently exceeding a threshold level of bandwidth utilization, wherein the threshold level is determined as a function of the number of clients utilizing bandwidth through the access node. Then, the transmission of a clear-to-send signal in response to a request-to-send signal received from clients on the list is prevented.

In an alternative embodiment, a method of managing bandwidth utilization in a wireless local area network is provided, comprising monitoring the bandwidth utilized by each client through the access node; dynamically maintaining a list identifying clients that are currently exceeding a threshold level of bandwidth utilization, wherein the threshold level is determined as a function of the number of clients utilizing bandwidth through the access node, and preventing the transmission of a clear-to-send signal in response to a request-to-send signal received from clients on the list.

In an alternative embodiment, a method of managing bandwidth utilization in a wireless local area network is provided, a method of managing bandwidth utilization in a wireless local area network is provided, wherein the wireless local area network includes a plurality of clients that access the network through an access node over a wireless medium, and the method comprising determining individual transmission bandwidth utilization for each client of the plurality of clients and a total transmission bandwidth available through the access node; and comparing the individual transmission bandwidth utilization for each client with a threshold transmission bandwidth utilization, wherein the threshold transmission bandwidth utilization is set as a function of the number of clients of the plurality of clients; responsive to a determination that a particular client's individual transmission bandwidth is greater than the threshold transmission bandwidth utilization, prohibiting a clear-to-send response to a request-to-send by the particular client, thereby preventing the particular client from utilizing additional bandwidth through the access node until it is no longer determined that the particular client's individual transmission bandwidth is greater than the threshold transmission bandwidth utilization.

Still further, in an alternative embodiment, a system for managing bandwidth utilization in a wireless local area network is provided. An access node provides wireless connectivity between clients in the wireless local area network. A plurality of clients access the network through the access node over a wireless medium, wherein the access node monitors the bandwidth utilized by each client through the access node. And, a storage device dynamically maintains a list identifying clients that are currently exceeding a threshold level of bandwidth utilization, wherein the threshold level is determined as a function of the number of clients utilizing bandwidth through the access node, and wherein the access node will not transmit a clear-to-send signal in response to a request-to-send signal received from clients on the list.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
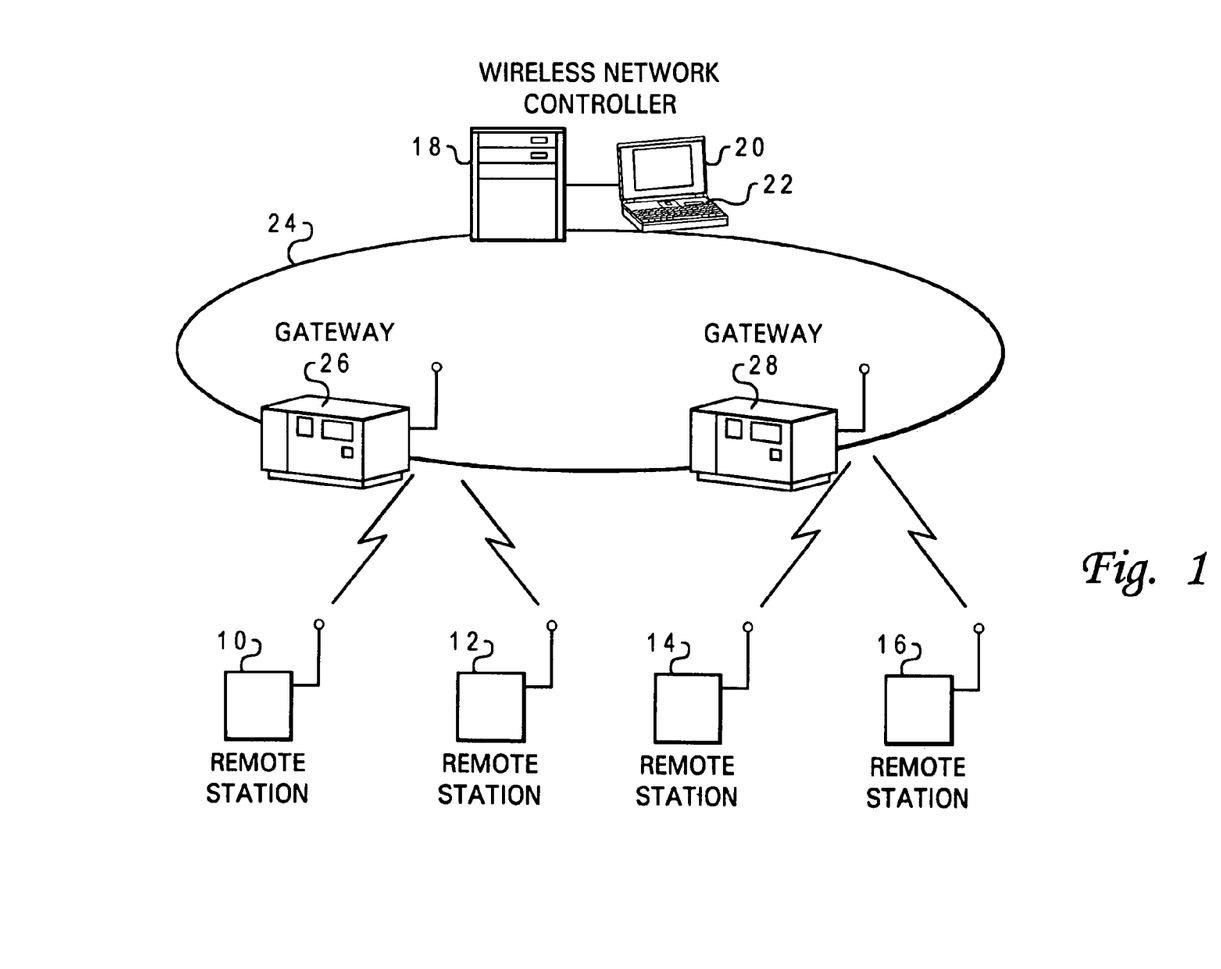
FIG. 1 depicts a radio system allowing communication between a plurality of remote stations, applications and data residing in a computing system, and implemented in accordance with a preferred embodiment of the present invention.
Figure 1A:
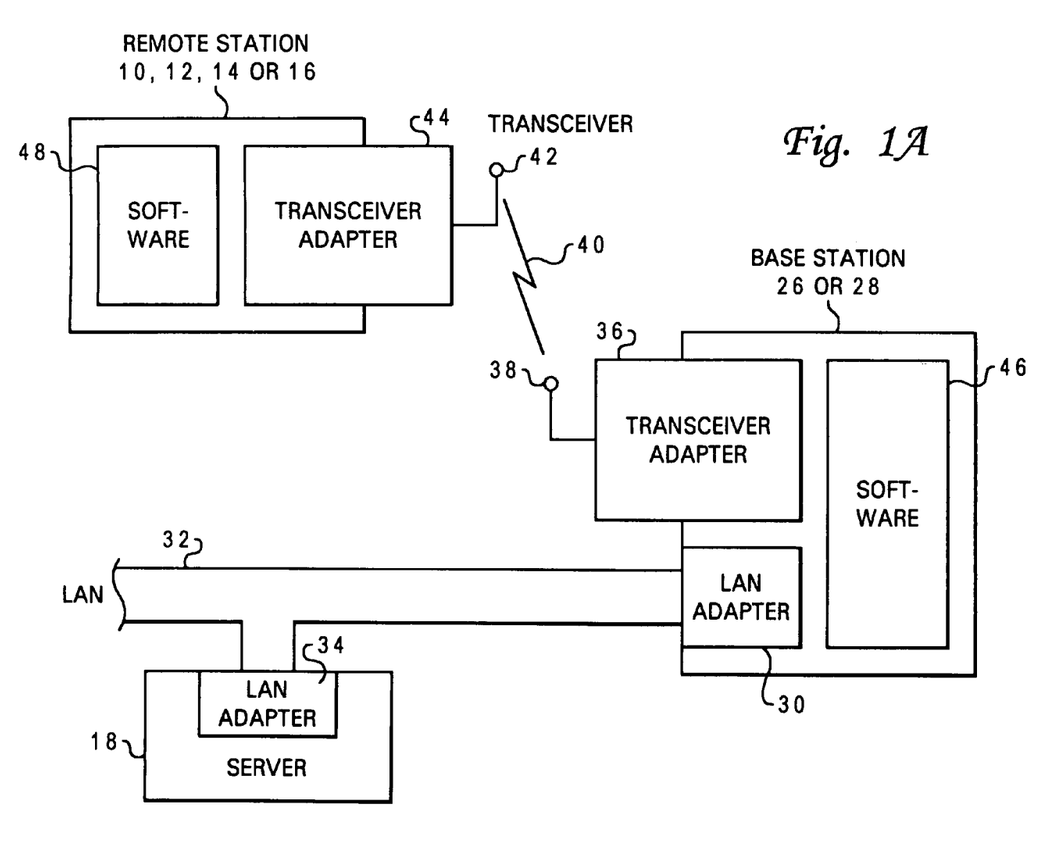
FIG. 1A depicts a base station and remote station of the radio system, in accordance with a preferred embodiment of the present invention.

With reference now to the figures, and in particular with reference to FIG. 1, there is shown a local area radio system allowing communication between a plurality of remote stations 10, 12, 14, and 16 and applications and data residing in a computing system, and implemented in accordance with a preferred embodiment of the present invention. The computing system typically includes a Wireless Network Manager (WNM) or Wireless Network Controller (WNC) 18, (the WNM or WNC is typically a card that is inserted into a computer system) with attached monitor 20 and keyboard 22, of a local area network (LAN), generally indicated by reference numeral 24, having a plurality of attached workstations or personal computers (not shown for simplicity). Also attached to the LAN are one or more access points 26 and 28 with which the remote stations 10, 12, 14, and 16 communicate. These access points are augmented according to the invention to provide certain radio system management functions which coordinate the remote stations' access to the common radio channel. Communications between remote stations is supported via relay through the access points 26 and 28. As shown in more detail in FIG. 1A, a access points 26 or 28, which may be a conventional microcomputer, has a LAN adapter 30 inserted in a bus slot and connected to LAN cabling 32. The WNM 18, typically also a conventional microcomputer and including one or more direct access storage devices (DASDs) such as hard disks (not shown), also has a LAN adapter 34 inserted in a bus slot and connected to LAN cabling 32. The LAN adapters 30 and 34 and the LAN cabling 32 together with LAN software constitute the LAN 24. The LAN 24 is of conventional design. The access points 26 or 28 also has an RF transceiver adapter 36 implemented as a printed circuit card which is inserted in a bus slot of the base station. Transceiver adapter 36 includes a spread spectrum transceiver of conventional design. Transceiver adapter 36 has an antenna 38 by which a radio link 40 is established with one or more remote stations, 10, 12, 14, or 16. The remote station may itself be a hand-held or lap-top computer of conventional design and, like the access point, it is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the remote stations are further provided with software, generally indicated by reference numerals 46 and 48, respectively, which support their respective transceiver adapters.

Figure 2:
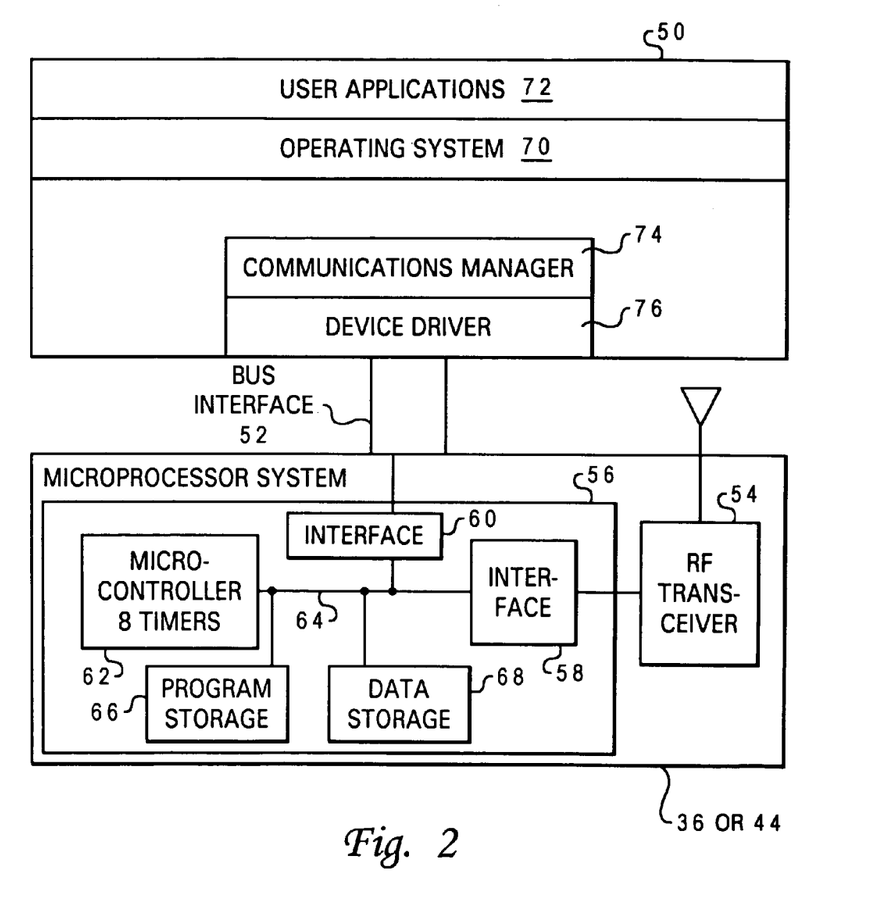
FIG. 2 shows the radio system common to both the remote stations and the base stations of FIG. 1, in accordance with a preferred embodiment of the present invention.

FIG. 2 shows the radio system common to both the remote stations and the access points of FIG. 1. The radio system includes a transceiver adapter 36 or 44 connected to the computer 50 via the computer's bus interface 52. The transceiver section is itself divided into an RF transceiver 54, which may be a commercially available spread spectrum transceiver, and a dedicated microprocessor system 56 which controls the transceiver via an interface 58. The microprocessor system 56 further includes a system interface 60 which interfaces the transceiver section to the computer section 50. The microprocessor system includes a dedicated microprocessor 62 containing high-resolution time interval determination hardware or "timers" typical of real-time microprocessor systems. Microprocessor 62 is connected by a memory bus 64 to program storage 66 and data storage 68 as well as to interfaces 58 and 60 providing attachment to bus interface 52 and RF transceiver 54, respectively. Program storage 66 is typically read only memory (ROM), while data storage 68 is static or dynamic random access memory (SRAM or DRAM). Packets received or to be sent are held in data storage 68 and communicated to or from the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54.

When a packet is received through the RF transceiver 54, the serial channels check the packet destination address, check for errors, and deserialize the packet to data storage 68. The serial channels must have the capability to recognize a specific adapter address as well as a broadcast address. The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

In a preferred embodiment, the wireless network operates in compliance with the IEEE 802.11 Standard, which provides a wireless connectivity system with access to one or more frequency bands for local area communications. The system may conform to the IEEE standard 802.11 "Direct Sequence Spread Spectrum Physical Layer Specification". Alternatively, the system may be employed utilizing the IEEE standard 802.11 "Frequency Hopping Spread Spectrum Physical Layer Specification" or any other protocol transmitting portions of packets at varying modulations and data rates. The standard defines three physical methods as well as two types of networking. The three different physical layer methods include two using radio frequency and one using infrared. The two radio physical layers operate in 2.4 GHz frequency range, one using frequency hopping spread spectrum (FHSS) and the other using direct sequence spread spectrum (DSSS). The one infrared physical layer operates using baseband infrared. Over the air data rates of 1 Mbps and 2 Mbps are defined in the standard. The IEEE 802.11 standard defines two types of networking, one being ad hoc networking and the other being infrastructure. An ad hoc network is a network composed solely of stations within mutual communication range of each other via the wireless medium. With ad hoc networking, the wireless clients communicate to each other without the need for a wired network or access points. An infrastructure contains one or more access points which provide wireless clients with access to the wired network.

The 802.11 standard is limited in scope to the physical (PHY) and medium-access-control (MAC) network layers. The PHY layer corresponds directly to the lowest layer defined by the International Standards Organization in its 7-layer Open System Interconnect (OSI) network model. The MAC layer corresponds to the lower half of the second layer of that same model with Logical Link Control (LLC) functions making up the upper half of OSI layer 2. The standard actually specifies a choice of three different PHY layers, any of which can underlie a single MAC layer. Specifically, the standard provides for an optical-based PHY that uses infrared light to transmit data, and two RF-based PHYs that leverage different types of spread-spectrum radio communications. The infrared PHY will typically be limited in range and most practically implemented within a single room. The RF-based PHYs, meanwhile, can be used to cover significant areas and indeed entire campuses when deployed in cellular-like configurations.

The infrared PHY provides for 1-Mbps peak data rates with a 2-Mbps rate optional and relies on Pulse Position Modulation (PPM). The RF PHYs include Direct Sequence Spread Spectrum (DSSS) and Frequency Hopping Spread Spectrum (FHSS) choices. As the names imply, both DSSS and FHSS artificially spread the transmission band so that the transmitted signal can be accurately received and decoded in the face of noise.

In 802.11, the DSSS PHY defines both 1- and 2-Mbps peak data rates. The former uses Differential Binary Phase Shift Keying (DBPSK) and the latter uses Differential Quadrature Phase Shift Keying (DQPSK). The standard defines the FHSS PHY to operate at 1 Mbps and allows for optional 2-Mbps operation. The PHY uses 2- or 4-level Gaussian Frequency Shift Keying (GFSK) modulation. Both DSSS and FHSS WLANs will operate in the same frequency band and neither requires site licenses or permits throughout the US, Europe, and Asia. The IEEE 802.11 standard specifies that the WLANs operate in the 2.4-GHz band that regulatory agencies around the world have set aside for spread spectrum usage.

One of the key advantages of the RF PHYs is the ability to have a number of distinct channels. The channelization allows ALAN users to co-locate channels in the same or adjacent areas to boost aggregate throughput or to deploy a cellular-like array of channel that support roaming clients. In the case of DSSS, different channels simply use different frequency bands. In the case of FHSS, the hopping sequence used differentiates one channel from the next, but all channels operate in the same wide frequency band.

Generally, the 802.11 spec defines 13 DSSS channels that are used to carry a spread 1-MHz signal. Channels overlap with a new center frequency located at 5 MHz intervals. For deployment in the US, the standard defines 11 independent DSSS channels in the ISM bandwidth allocated by the FCC. Throughout much of Europe and much of ASIA that follows the lead of European regulatory agencies, DSSS implementations can leverage 13 channels. In Japan, however, the allocated bandwidth only supports a single channel. In the US and Europe, the channel definition ensures that three frequency-isolated channels are available for collocation. FHSS systems, meanwhile, are mandated to use 79 hops or center frequencies in the US and Europe and 23 hops in Japan. Typically, FHSS systems dwell at each hop for 20 msecs. The spec defines 78 different hopping sequences, and each independent hopping sequence is defined as a channel. Practically, however, only a few channels can be effectively deployed in close proximity to one another.

BSS configurations rely on an Access Point (AP) that acts as the logical server for a single WLAN cell or channel. Communications between node A and node B actually flow from node A to the AP and then from the AP to node B. An AP is necessary to perform a bridging function and connect multiple WLAN cells or channels, and to connect WLAN cells to a wired enterprise LAN.

The 802.11 standard specifies that the MAC layer handle acknowledgement and that the MAC layer resend lost frames resulting in more efficient usage of the available bandwidth and quicker acknowledgement. The 802.11 frame format relies on an interframe spacing of 50 microsecs. The standard requires that the receiving station send an acknowledgement 10 microsecs after the end of each frame providing the CRC check is correct. The 10 microsec limit ensures that the receiving station can take immediate control of the airwaves rather than competing with other nodes for medium access as would be required if it waited past the 50-microsec interframe spacing. LANs that handle acknowledgement in layers above the MAC can't meet the strict timing requirements and therefore essentially compete for medium access and send a standard frame to convey each acknowledgement. The MAC-layer implementation eliminates the latencies of medium access and allows the acknowledgement to use some of the interframe spacing time period in which no other activity would occur in any case.

The collision avoidance scheme adopted in 802.11 requires a station to avoid transmitting while other nodes are actively transmitting. The 802.11 includes an optional Request To Send (RTS)/Clear To Send (CTS) provision to protect against hidden-station interference. 802.11 receivers must support RTS/CTS, but support is optional in transmitters. To use the facility, the transmitting node sends an RTS request to the AP requesting to reserve a fixed amount of time necessary to transmit a frame of given length. When the medium is available, the AP broadcasts a CTS message that all stations can hear assuring the transmitting node of access to the air for the requested amount of time.

In accordance with the preferred embodiment, hardware and firmware within an access point allows dynamic load balancing between access points within the 802.11 wireless LAN. The access point uses the RTS/CTS protocol to reduce the bandwidth available to a single device using an excessive amount of bandwidth that restricts the amount of bandwidth available to the other clients on the LAN. As explained above, the 802.11 protocol provides that each client sends an RTS with a time duration when that client needs to send information over the LAN. If the access point is free and not servicing another client, it will send a CTS and "freeze out" (i.e., reject requests for bandwidth) other clients on the LAN during the time duration defined in the RTS. If the access point does not respond with a CTS, the client will continue to resend the RTS on regular intervals until it receives a CTS. In accordance with a preferred embodiment of the present invention, the access point places a device that has been monopolizing a channel on a Restricted List, and regulates bandwidth on the network by not returning a CTS to any client on the Restricted List.

Figure 3:
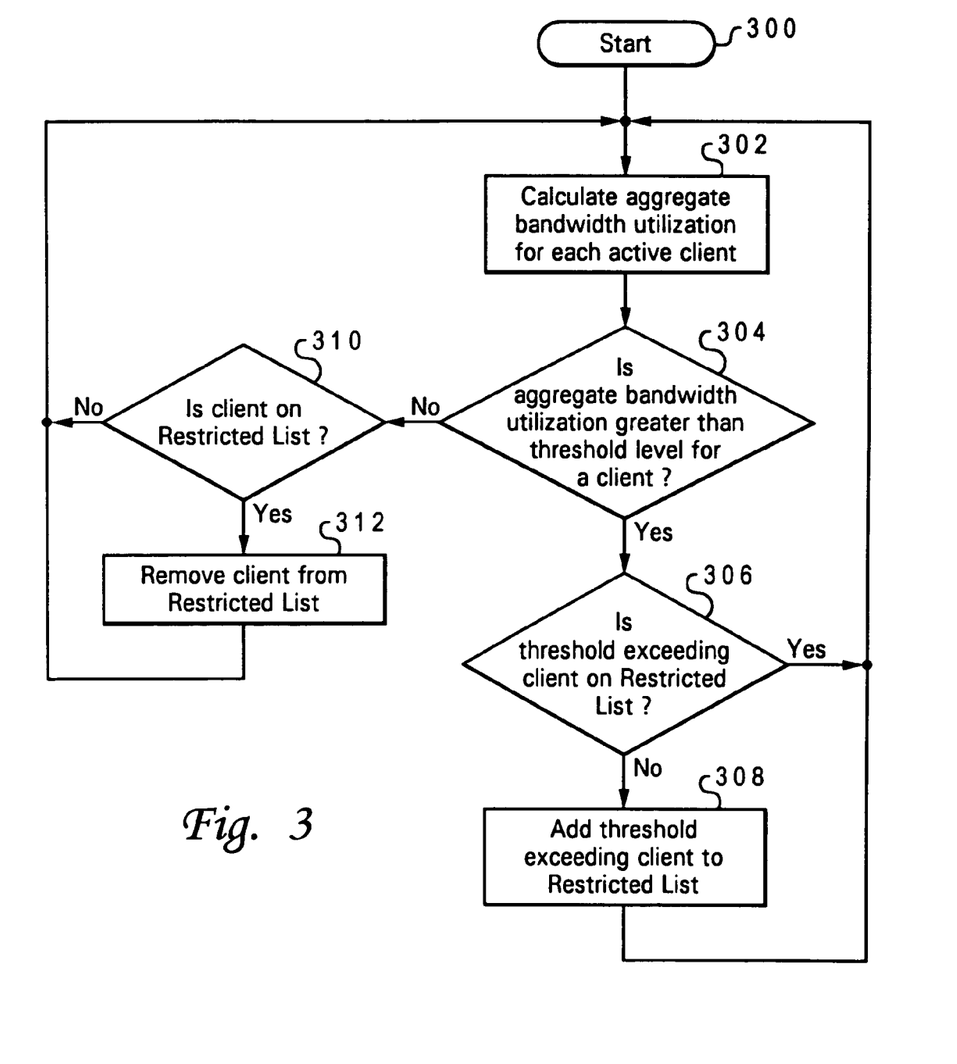
FIG. 3 shows a flow diagram of a method for tracking bandwidth utilization in a wireless local area network, in accordance with the preferred embodiment of the present invention.

FIG. 3 shows a flow diagram of a method for tracking bandwidth utilization in a wireless local area network, in accordance with the preferred embodiment of the present invention. The process starts at step 300 and proceeds to step 302, where the aggregate bandwidth utilization for each active client within the local area network is calculated. In a preferred embodiment, these bandwidth checks would be handled by monitoring signals at the network ODI layer 3 and identifying bandwith usage. Firmware at ODI layer 4 would track the percent of bandwidth used across all connections on the access point and track the changes. This is performed by tracking the IP address of each client and counting the number of data packets sent by each client over a defined time period. For example, in a preferred embodiment, this time period would be set to ten minutes within which the aggregate bandwidth utilization for each active client is measured. This time period can be set by a policy previously defined by the system designer or user. The firmware would calculate the percent bandwidth used by a particular client by dividing the number of packets sent by that client divided by the total bandwidth of the access point utilized by the client. The total bandwidth of an access point is calculated by multiplying the channel bandwidth times the number of channels at the access point. For example, for an access point with an eleven Megabits per second per channel bandwidth (11 Mbits/sec/channel), a total of eleven channels would have a total bandwidth of 121 Megabits per second (121 Mbits/sec).

Referring back to FIG. 3, the process then proceeds to decision block 304, where a determination is made whether the aggregate bandwidth utilization of a particular client is greater than a preset threshold level. Again, the threshold levels are driven by policies. In a preferred embodiment, the policy would set the threshold to a fifty percent level if the wireless LAN currently has only one active user. An active client is defined as a client that has utilized bandwidth within the predetermined time interval (i.e. 10 minutes) The policy sets the threshold level to twenty percent when there are less than ten and greater than one active clients on the wireless LAN. The policy sets the threshold level to ten percent when there are less than fifty and greater than ten active clients. Above fifty users, the threshold level is set to five percent. Of course, in alternative preferred embodiments, the thresholds can be policy driven based on other criteria other than a number of users, such as a policy based on geography, for instance.

If the determination at step 304 is that the aggregate bandwidth utilization is greater than the threshold level for a given client, the process proceeds to step 306 where a determination is made whether the client that has exceeded the threshold level is on a Restricted List. The Restricted List is a list of client IP addresses for clients that have aggregate bandwidth utilizations that exceed the current threshold level. The Restricted List is stored in the access point and is accessed during step 306. If a determination at step 306 is made that the threshold exceeding client is not on the Restricted List, the process proceeds to step 308, where the threshold-exceeding client is added to the Restricted List stored in the access point. Thereafter, the process returns to step 302 to again calculate the aggregate bandwidth utilization for each active client. If a determination is made at step 306 that the threshold-exceeding client is on the Restricted List, the process returns to step 302.

Referring back to decision block 304, if a determination is made that the aggregate bandwidth utilization is not greater than the threshold level for a particular client, the process proceeds to decision block 310, where a determination is made whether the particular client determined to be not utilizing aggregate bandwidth in excess of the threshold level is on the Restricted List. If the client is not on the Restricted List, the process returns to step 302, where aggregate bandwidth utilization is again calculated. If the particular client was on the Restricted List, but is determined at step 304 to no longer be exceeding the threshold level for its aggregate bandwidth utilization, the process proceeds to step 312, where the client is removed from the Restricted List. Thereafter, the process returns to step 302.

Figure 4:
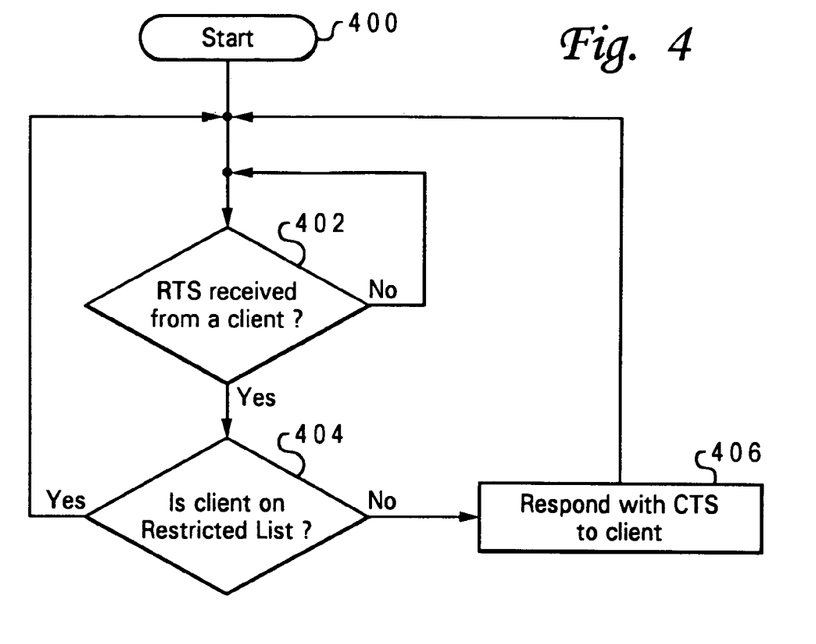
FIG. 4 shows a flow diagram of a method for managing bandwidth utilization in a wireless local area network, in accordance with the preferred embodiment of the present invention.

Referring now to FIG. 4, there is shown a flow diagram of a method for managing bandwidth utilization in a wireless local area network, in accordance with the preferred embodiment of the present invention. The process starts at step 400 and proceeds to decision block 402, which shows a determination whether a RTS has been received at the access point from a client attached to the wireless network. If the access point has not received an RTS, the process returns to decision block 402 to repeat the step awaiting the receipt of a RTS. If a RTS is received from a client, the process passes to decision block 404, which determines whether the client who had sent the received RTS is on the Restricted List. The Restricted List stored in the access point is searched to determine if the IP address of the client requesting bandwidth is found. If the client's IP address is found on the Restricted List, its bandwidth utilization has exceeded the current threshold, and the access point will not respond to the client's RTS with a CTS. This leaves the access point accessible to other clients who require network bandwidth and are sending an RTS. If the determination at decision block 404 is that the client is not on the Restricted List, the process proceeds to step 406, where the access point responds to the client with a CTS and will free up the requested channel for the client. Upon expiration of the time duration requested in the RTS, the process returns to decision block 402, where the access point awaits receipt of a new RTS.

Over time, since the Restricted List is dynamically updated, the bandwidth utilization of the restricted client will eventually fall below the threshold because the client will continually be denied additional bandwidth. Once the client's bandwidth utilization drops below the threshold, its IP address is removed from the Restricted List, and, thereafter, its received RTS at step 402 will be serviced at step 406 after passing through decision block 404. Since the client continues sending its RTS until given bandwidth, it will eventually receive a CTS, once it falls below the threshold level and the channel is free.

Figure 5:
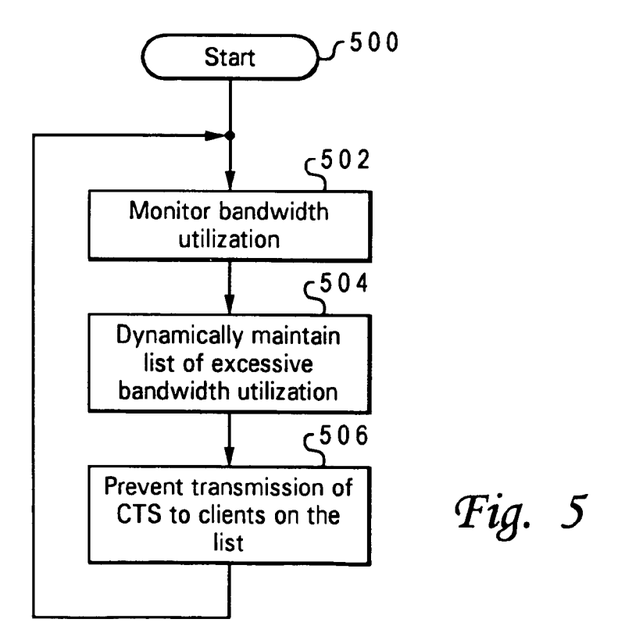
FIG. 5 shows a flow diagram of a method of managing bandwidth utilization in a wireless local area network, in accordance with an alternative preferred embodiment of the present invention.

FIG. 5 shows a flow diagram of a method of managing bandwidth utilization in a wireless local area network, in accordance with an alternative preferred embodiment of the present invention. The process starts at step 500, and proceeds to step 502, where bandwidth utilization by clients within the wireless LAN is monitored. The process then proceeds to step 504 where a list identifying clients that are currently exceeding a threshold level of bandwidth utilization within the wireless LAN is dynamically maintained within the access node. The threshold level is set by a policy as a function of the number of users accessing bandwidth. The list is dynamically maintained such that as a client reduces its bandwidth utilization and drops below a defined threshold level it is taken off the list. The process then proceeds to step 506, where the transmission of a CTS in response to an RTS is prevented, when the RTS is received from a client on the list generated at step 504. Thereafter, the process continually repeats the process flow. While the invention has been particularly shown and described with reference to a preferred embodiment, it will be understood by those skilled in the art that various changes in form and detail may be made therein without departing from the spirit and scope of the invention.

What is claimed is:

1. A method of managing bandwidth utilization in a wireless local area network, wherein the wireless local area network includes a plurality of clients that access the network through an access node over a wireless medium, comprising:
   determining individual transmission bandwidth utilization for each client of the plurality of clients and a total transmission bandwidth available through the access node;
   comparing the individual transmission bandwidth utilization for each client with a threshold transmission bandwidth utilization, wherein the threshold transmission bandwidth utilization is set as a function of the number of clients of the plurality of clients; and
   responsive to a determination that a particular client's individual transmission bandwidth is greater than the threshold transmission bandwidth utilization, prohibiting a clear-to-send response to a request-to-send by the particular client, thereby preventing the particular client from utilizing additional bandwidth through the access node until it is no longer determined that the particular client's individual transmission bandwidth is greater than the threshold transmission bandwidth utilization.

2. The method of claim 1, further comprising the step of:
   wherein a determination that a particular client's individual transmission bandwidth is greater than the threshold transmission bandwidth utilization is made by accessing a list in response to receiving a request-to-send signal from a client to determine if the client is on the list.

3. The method of claim 1, wherein the threshold transmission bandwidth utilization is determined as a function of the total available bandwidth through the access node.

4. The method of claim 2, wherein each client is identified in the list by a unique Internet Protocol address.

5. The method of claim 1, wherein the wireless local area network operates in compliance with the IEEE 802.11 standard.

6. The method of claim 1, wherein the threshold level is determined as a function of the number of clients utilizing bandwidth through the access node.

7. A system of managing bandwidth utilization in a wireless local area network, wherein the wireless local area network includes a plurality of clients that access the network through an access node over a wireless medium, comprising:
   means for determining individual transmission bandwidth utilization for each client of the plurality of clients and a total transmission bandwidth available through the access node;
   comparing the individual transmission bandwidth utilization for each client with a threshold transmission bandwidth utilization; and
   responsive to a determination that a particular client's individual transmission bandwidth is greater than the threshold transmission bandwidth utilization, prohibiting a clear-to-send response to a request-to-send by the particular client, thereby preventing the particular client from utilizing additional bandwidth through the access node until it is no longer determined that the particular client's individual transmission bandwidth is greater than the threshold transmission bandwidth utilization.

8. The system of claim 7, further comprising means:
   wherein a determination that a particular client's individual transmission bandwidth is greater than the threshold transmission bandwidth utilization is made by accessing a list in response to receiving a request-to-send signal from a client to determine if the client is on the list.

9. The system of claim 7, wherein the threshold transmission bandwidth utilization is determined as a function of the total available bandwidth through the access node.

10. The method of claim 7, wherein each client is identified in the list by a unique Internet Protocol address.

11. The system of claim 7, wherein the wireless local area network operates in compliance with the IEEE 802.11 standard.

12. The system of claim 7, wherein the threshold transmission bandwidth utilization is set as a function of the number of clients of the plurality of clients.

* * * * *